United States Patent [19]

Cronin-Golomb et al.

[11] Patent Number: 4,529,273
[45] Date of Patent: Jul. 16, 1985

[54] PASSIVE PHASE CONJUGATE MIRROR

[75] Inventors: Mark Cronin-Golomb, Pasadena; Baruch Fischer, Los Angeles; Jeffrey O. White, Pasadena; Amnon Yariv, San Marino, all of Calif.

[73] Assignee: California Institute of Technology, Pasadena, Calif.

[21] Appl. No.: 451,849

[22] Filed: Dec. 21, 1982

[51] Int. Cl.$^3$ .......................... G02B 5/08; G02F 1/01
[52] U.S. Cl. ....................................... 350/354; 372/99
[58] Field of Search ...................... 350/3.62, 354, 393; 372/99; 307/425

[56] References Cited

U.S. PATENT DOCUMENTS 4,233,571 11/1980 Wang et al. ............................ 372/99

OTHER PUBLICATIONS

Feinberg et al., "Phase-Conjugating Mirror with Continuous-Wave Gain", Optics Letts. 12-1980, pp. 519-521.
Yariv, A., "Phase Conjugate Optics & Real-Time Holography" IEEE Jr. of Quantum Electronics, 9-1978, pp. 650-660.
Cronin-Golomb et al., "Passive (Self-Pumped) Phase Conjugate Mirror: Theoretical & Experimental", App. Phys. Lett. 10-1982, pp. 89-91.
"Laser with Dynamic Holographic Intracavity Distortion Correction Capability," by Mark Cronin-Golomb, Baruch Fischer, Joseph Nilsen, Jeffrey O. White & Amnon Yariv, Appl. Phys. Lett. 41(3), 8/1/82.
"Coherent Oscillation by Self-Induced Gratings in the Photorefractive Crystal BaTiO$_3$," by Jeffrey O. White, Mark Cronin-Golomb, Baruch, Fischer, & Amnon Yariv, Appl. Phys. Lett. 40(6), Mar. 15, 1982.

Primary Examiner—William H. Punter
Attorney, Agent, or Firm—Freilich, Hornbaker, Rosen & Fernandez

[57] ABSTRACT

A passive (self-pumped) phase conjugate mirror uses a third-order nonlinear polarization medium, either of the refractive type (effective nonlinear) or the actual nonlinear type, with an optical system of one or more mirrors to reflect back through the medium a coherent incident beam diffracted by the medium. With two mirrors, they may be aligned to form a linear optical cavity containing the nonlinear medium, or they may be so oriented on one side of the medium that the incident beam transmitted through the medium is reflected back through the medium at an angle with the incident beam, and diffracted light from the incident beam is reflected back through the medium in the opposite direction coincident with the incident beam. A passive phase conjugate mirror may replace an end mirror of an optical cavity for a laser gain medium. Phase distortions of the laser beam in the laser cavity are corrected by the passive phase conjugate mirror.

10 Claims, 10 Drawing Figures

PASSIVE PHASE CONJUGATE MIRROR

ORIGIN OF INVENTION

The invention described herein was made in the performance of work by California Institute of Technology, Pasadena, Calif. under a Contract DAAG-29-80-C-0021 with the Department of the Army.

BACKGROUND OF THE INVENTION

This invention relates to a passive (self-pumped) phase conjugate mirror and to its use as an end mirror in a laser resonator for correction of intracavity phase distortion.

The concept of phase conjugation is well known and described in the literature. This has application in many systems for imaging through distorting media using phase conjugation by four-wave mixing, thereby to correct the distortion. A particular application is in providing a reflecting mirror to assist in the buildup of oscillation in a CW laser.

The technology of a phase conjugate mirror (PCM) is a branch of phase conjugate optics (PCO) which uses nonlinear optical media. For a tutorial paper on PCO used to perform a variety of optical functions, such as PCM's, see A. Yariv, IEEE J. Quantum Electron. QE-15, 650 (1978).

In the past, PCM technology was based either upon stimulated scattering processes, such as stimulated Brillouin scattering (SBS) or stimulated Raman scattering (SRS), or upon four-wave mixing in third-order optically nonlinear media using one or two high-quality external pumping beams. A major disadvantage of the SBS or SRS method was its associated high light intensity threshold, typically megawatts per $cm^2$, while a major disadvantage of the four-wave mixing method was a requirement for coherence of the pumping beams with the incident signal beam from a coherent light source, such as a laser. An object of this invention is to provide a passive (self-pumped) phase conjugate mirror (PPCM) free of these limitations.

SUMMARY OF THE INVENTION

In accordance with this invention, a PPCM is comprised of a third-order (actual or effective) nonlinear polarization medium and a passive optical system, here exemplified by one or more ordinary mirrors so disposed relative to the medium as to reflect back through the medium a coherent incident beam diffracted by the medium. In one embodiment, two mirrors are aligned to form a linear optical cavity containing the medium. The input beam is positioned so that it enters the medium on one side with the medium so oriented that light in the cavity experiences gain via nonlinear optical coupling in the medium. The beams of light thereby generated in the cavity between the aligned mirrors act as pumping beam for the medium, which then acts as a four-wave mixing PCM for the input beam. This provides coherence of the pumping beams with the input (signal) beam. A variation of this embodiment consists of removing one of the cavity mirrors. Four-wave mixing will take place with the two beams associated with the one remaining mirror (one incident and one reflected) together with the input and retroreflected beams, i.e., together with the input signal beam and the phase conjugate output signal beam.

In a second embodiment, the two mirrors are aligned to reflect radiation passing through the medium from the input beam back through the nonlinear medium. In that manner, two of the four beams required for four-wave mixing are provided from the beginning. The other two beams are generated by nonlinear interaction in the medium.

Either PPCM embodiment may be used to correct an aberration in the incident beam, such as for transmitting an imaging beam through distorting media. A specific example is in a laser. By replacing an end mirror in a laser cavity with a PPCM, any phase distortions of the laser beam in the laser cavity are corrected to provide an undistorted beam reflected back through the laser cavity.

DESCRIPTION OF PREFERRED EMBODIMENTS

Figure 1:
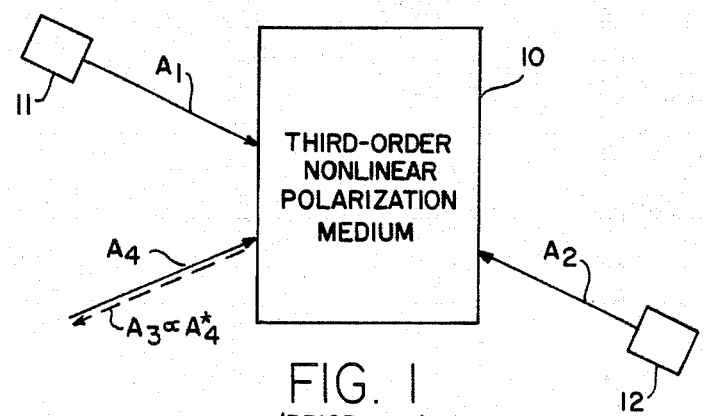
FIG. 1 illustrates diagramatically conventional four-wave mixing PCM using two external pumping beams.

Referring now to FIG. 1, a conventional four-wave mixing phase conjugate mirror is comprised of a medium 10 characterized by an effective third-order nonlinear polarization. The medium provides four-wave mixing of a coherent incident (signal) beam $A_4$ with pumping beams $A_1$ and $A_2$ from coherent sources 11 and 12, as described by Yariv (supra). Waves of beams $A_1$ and $A_2$ are arranged to pass through the medium 10 in exact opposition, and at some angle to the direction of the beam $A_4$ through the medium so oriented as to produce self-induced diffraction gratings in the medium.

The dimensions and orientation of the medium and the angle between the pumping beams ($A_1$ and $A_2$) with the incident beam ($A_4$) are selected for optimum four-wave mixing as determined by such physical factors as spatial frequency response of the medium and achievable interaction length. The four-wave mixing includes not only the incident beam $A_4$ and pumping beams $A_1$ and $A_2$, but also the phase conjugate beam $A_4^*$ shown as a beam $A_3$ emanating from the nonlinear medium on the left in exact opposition to the incident beam but in "time reversal."

Figure 2A:
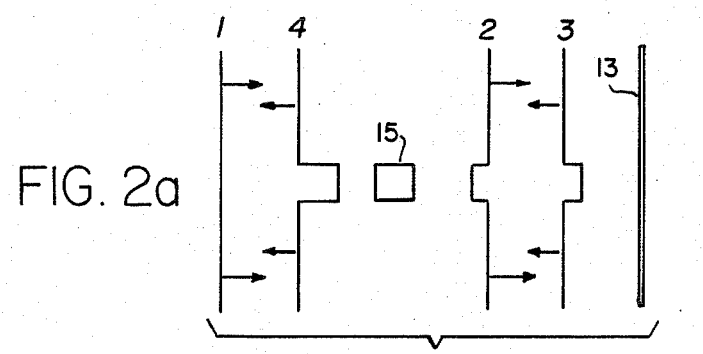
FIGS. 2a and 2b illustrate the difference between a distortion in a wavefront augmented by an ordinary plane mirror and corrected by a PCM.
Figure 2B:
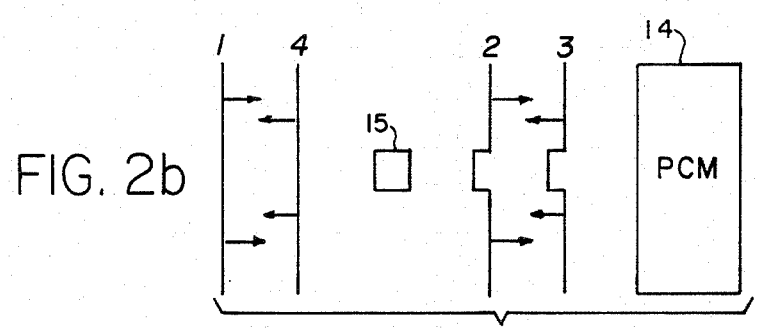

The "time reversal" referred to is best illustrated by comparing a conventional plane mirror 13 shown in FIG. 2a with a phase conjugate mirror (PCM) 14 shown in FIG. 2b. In both cases, a plane wave 1 is incident on a distorting element 15 (such as glass cube) and emerges as a distorted wave 2 with a trailing bulge. In FIG. 2a, the reflected wave 3 (with its bulge still trailing) traverses the distorting element in the opposite direction, thus doubling the extent of the bulge. It is thus evident that a conventional mirror augments distortions in an incident beam. In FIG. 2b, the PCM 14 implemented as shown in FIG. 1 produces the reflected wave 3 which can be demonstrated mathematically to be related to the complex conjugate of the incident wave. See Yariv (supra). Consequently, the trailing bulge in the incident wave 2 becomes a leading bulge in the reflected wave 3. This "time reversal" is useful in that, upon passing through the distorting element, the bulge will be exactly cancelled, leaving an undistorted wave 4 as the reflected wave from the PCM.

A problem with such a PCM is that the pumping beams $A_1$ and $A_2$ must be coherent with the incident beam, as noted hereinbefore. If the incident beam originates on one side of the distortions, and the phase conjugate mirror is on the other side of the distortion, it is virtually impossible to obtain coherence of the pumping beams with the input signal beam $A_4$ without deriving the pumping beams from the same source as the input signal beam and, of necessity passing them through the same distorting element or medium to the nonlinear medium, in which case the pumping beams will have been distorted as well as phase shifted, and will have lost their utility as reference beams for the PCM. If the response time of the medium is sufficiently fast, the coherence requirement may not be important, but in either case, it is a practical inconvenience to have to make every PCM an active device, i.e., to include in every PCM a source of pumping beams frequency matched to the coherent input signal beam.

The present invention provides a technique for deriving the pumping beams from the coherent input beam passing through the medium (i.e., diffracted and/or transmitted through the medium). In that manner, coherence is assured between the four waves in the mixing process for phase conjugation, even with a distorting element or medium in the path of the incident beam $A_4$.

Figure 3A:
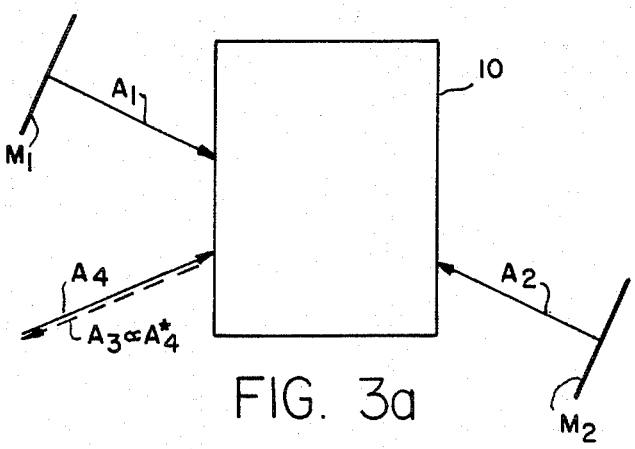
FIG. 3a illustrates one embodiment of a four-wave mixing passive (self-pumping) PCM.

A first embodiment is illustrated in FIG. 3a in which the same reference characters are used as in FIG. 1 to facilitate comparison. By comparing that figure with FIG. 1, it is evident that the sources of input beams $A_1$ and $A_2$ used for pumping are replaced by conventional mirrors $M_1$ and $M_2$ positioned to form a linear optical cavity so that the opposing beams $A_1$ and $A_2$ coincide. These mirrors are shown as plane mirrors but may be shaped to so reflect the beams back into the medium 10 that optimum energy is concentrated in a small volume where the beams intersect to produce a self-induced diffraction grating. The input beam $A_4$ is incident on the medium at an angle selected for optimum four-wave mixing. Again the phase conjugate beam $A_3$ is proportional to $A_4^*$ is shown as the fourth wave for the four-wave mixing in a direct opposition to the incident beam $A_4$.

In a successful experiment of this first embodiment, a crystal of barium titanate ($BaTiO_3$), a refractive material, was used as an effective third-order nonlinear medium. The crystal measured $7 \times 4.5 \times 4$ mm. It was oriented so that light in beam $A_1$ experiences gain, i.e., is amplified by two-beam coupling from input beam $A_4$ and is fed back by successive reflections from mirrors $M_2$ and $M_1$. Oscillation continues to build up until steady state is reached for beams $A_1$ and $A_2$ which are then pumping the crystal as a PCM for input beam $A_4$.

In operation, the incident beam $A_4$ is diffracted by the third-order nonlinear medium 10 in the direction of the mirror $M_2$ where it is reflected as beam $A_2$ that is partially diffracted and partially transmitted through the medium to the mirror $M_1$ on the opposite side. There the beam is reflected as beam $A_1$. Phase conjugation by four-wave mixing is thus achieved with only the incident beam.

Figure 3B:
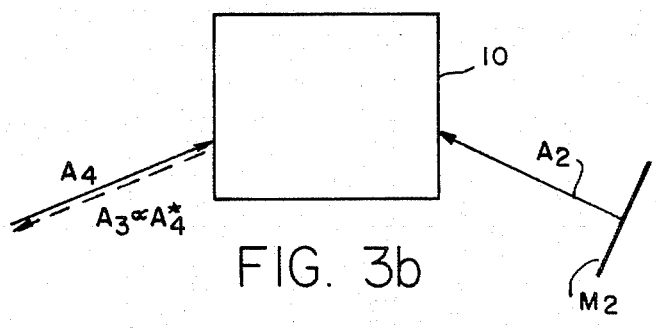
FIG. 3b illustrates a variant of this embodiment.

A variant of this first embodiment is shown in FIG. 3b wherein the same reference characters are used as in FIG. 3a. The difference may be noted at a glance, which is the omission of the mirror $M_1$. This variant is useful when the coupling constants associated with the medium are sufficiently high. See a paper published on Oct. 15, 1982 by the inventors titled "Passive (self-pumped) phase conjugate mirror: Theoretical and experimental investigation," Appl. Phys. Lett. 41, 689. Its main advantage is the absence of mirror $M_1$, which previously had to be aligned quite accurately.

The complex conjugate of the incident beam $A_4$ can also be produced with a different arrangement of two mirrors $M_1$ and $M_2$ which places the mirrors on the same side of the nonlinear medium, as shown in FIG. 4 where again the same reference characters are used as in earlier figures to facilitate comparison. The incident beam $A_4$ transmitted through the medium as a beam $A_4'$ is reflected by a mirror $M_2$ and then from a mirror $M_1$ back into the medium as a pumping beam $A_1$, and beams $A_2$ and $A_3$ are generated from nonlinear interaction in the crystal of all the waves. In that manner four-wave mixing is achieved with only the incident beam $A_4$ as a source of coherent light.

Figure 4:
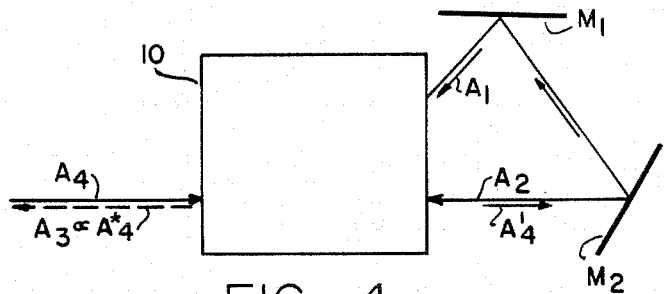
FIG. 4 illustrates a second embodiment of a four-wave mixing passive (self-pumping) PCM.

An important advantage of this arrangement is the ease with which the mirrors can be aligned. It is only necessary to position the mirrors $M_1$ and $M_2$, as shown in FIG. 4, so that the beam $A_4'$ transmitted through the medium is directed back through the medium as a pumping beam $A_1$. Coherent light from the input beam $A_4$ diffracted in the direction of the mirror $M_1$ is reflected to the mirror $M_2$, which in turn reflects that light into the medium as a beam $A_2$.

Several photorefractive or nonlinear optical materials may be used to provide phase conjugation of an input beam by self-induced gratings using only the input beam and one or two conventional mirrors, thus forming passive (self-pumping) phase conjugate mirrors. Passive phase conjugate mirrors have been successfully operated using as an effective third-order nonlinear polarization medium such materials as barium titanate ($BaTiO_3$), noted hereinbefore, and strontium barium niobate ($Sr_{1-x}Ba_xNb_2O_6$). A theoretical analysis of the first embodiment shown in FIG. 3a is given in Appl. Phys. Lett. 41, 689, (Oct. 15, 1982) by the inventors hereof for barium titanate, a photorefractive (effectively nonlinear) material.

The gain for build up of oscillation beams in nonlinear media depends upon their frequency offset from the incident beam. The frequency of the oscillation beams is thus determined by the gain characteristics of the specific nonlinear medium and optical system in question. In particular, any required spatial phase shift between the refractive index grating and the light interference pattern can be supplied by this offset in conjunction with the finite response time of the medium. Photorefractive media naturally provides this phase shift for zero offset so the oscillation beams build up with the same frequency as the incident beam. Thus, other nonlinear media in the passive phase conjugate mirror besides a photorefractive material may generate nonzero frequency offset in their oscillation beams.

In view of the fact that the required spatial phase shift between the refractive index grating and the light interference pattern will adjust itself in a third-order nonlinear polarization medium, it is evident that such a medium may be used in place of a refractive (effective nonlinear) medium. Consequently, the term "third-order nonlinear polarization medium" is intended to encompass both refractive and nonlinear media.

Figure 5A:
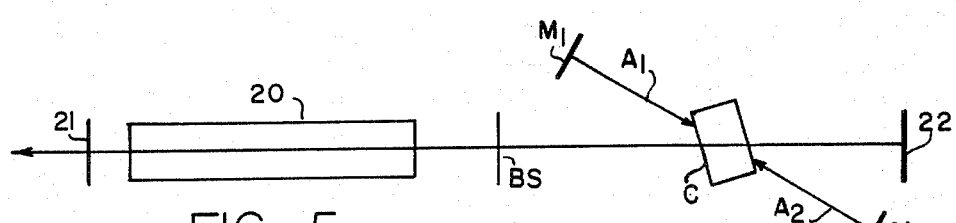
FIGS. 5a and 5b illustrate an exemplary application of the embodiment of FIG. 3a to a laser resonator and FIGS. 6a and 6b illustrate the same application of the variant illustrated in FIG. 3b.
Figure 5B:
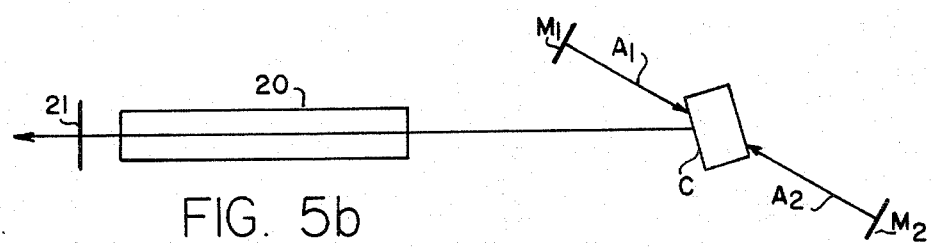

The application of that first embodiment to a new phase conjugate resonator (PCR) for a laser will now be described. The main optical component of the new PCR laser shown in FIGS. 5a and 5b is the PPCM, a phase conjugate mirror whose pumping beams are generated via optical interactions in the nonlinear medium by the input beam to be conjugated as described with reference to FIG. 3a. An experimental arrangement used as the laser gain medium 20 is a Spectra Physics Model 171 argon ion laser.

FIG. 5a shows the starting arrangement of the PCR laser. Lasing is initially induced at the high gain line, 488 nm, between mirror 21 and beam splitter BS. Light transmitted through the beam splitter causes oscillation in the PPCM, the resonator consisting of a barium titanate crystal C and mirrors $M_1$ and $M_2$. This is oscillation of the type described with reference to FIG. 3a. Retroreflecting mirror 22 is used to assist in the buildup of oscillation. With oscillation established between mirrors $M_1$ and $M_2$, the beam splitter BS and the retroreflecting mirror 22 are removed, as shown in FIG. 5b. Once the grating is established, the configuration of FIG. 5b corresponds to an equilibrium state, and the grating in the crystal is continuously maintained by the very beams which it couples together.

Figure 6A:
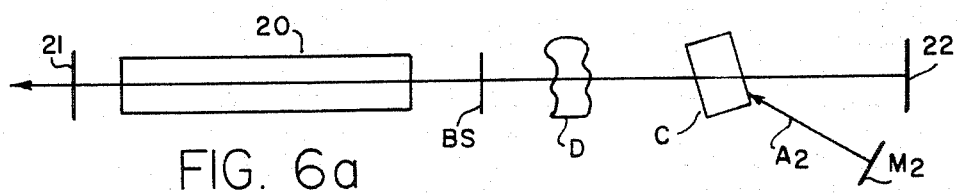

There is a certain two beam coupling strength in the crystal, above which it is possible to maintain oscillation between the crystal and mirror $M_2$ even in the absence of mirror $M_1$. Experiments were conducted to demonstrate such oscillation. FIG. 6a depicts the starting arrangement. Once oscillation involving mirror $M_2$ is established, the beam splitter BS and mirror $M_1$ are removed. The laser will continue to oscillate in the configuration shown in FIG. 6b.

Figure 6B:
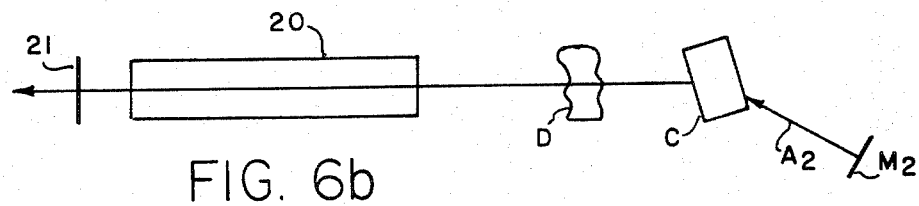

To demonstrate the distortion correction capability of the PCR laser with the PPCM, it was started in the configuration of FIG. 6a and operated in the configuration of FIG. 6b with a severe distortion element D placed between the barium titanate crystal C and the laser gain medium 20. The result was an undistorted intensity pattern which was photographed as a small well defined spot (about 2 mm diameter) at a distance of 1 m from the output mirror 21. The laser intensity was 3 mW, obtained at only 21 amperes laser current. Operating the laser in a conventional fashion with the crystal C replaced by a high reflectivity dielectric mirror, and with the distortion element D in the beam path, gave rise to a highly distorted beam photographed as an ill-defined spot of more than five times the diameter of the corrected laser beam with many dark areas. The laser intensity was only 1 mW at 38 A laser tube current. The compensation effect of the PPCM was thus very evident.

In addition, the power output at 38 amperes laser tube current in the conventional resonator with the distortion inside was only about 1 mW compared to about 500 mW with the PPCM. This plus the distortion correction indicates that each of the oscillations—one in the mirror 21-crystal arm and the second in the $M_2$-crystal arm—is composed of two oppositely traveling waves which are phase conjugates of each other. The crystal thus acts simultaneously as a PCM to the two beams which are incident on it, coupling, in the process, the two arms to each other. This mode of oscillation, where the counter-propagating beams in each arm are phase conjugate to each other, may not be the only allowed stable configuration but in the presence of spatial filters, such as the plasma bore tube, it is the minimum diffraction loss configuration and thus the one surviving in a laser oscillator.

The loss of independence of the pump beams in the PPCM causes one difference from a regular PCM. Longitudinal modes are present in the cavity and correspond to the normal modes observed in a standing wave resonator. This has been observed by using an optical spectrum analyzer to analyze the output of the laser.

Finally, it was noted that in comparison with the light intensity (600 mW at 24 amperes tube current) inside the mirror 21-crystal cavity, the amount of light lost from the PCM both in the beam extending straight through the crystal from the laser gain (6 mW) and the beam extending straight through the crystal from the mirror $M_1$ (16 mW) is quite small.

In conclusion, the present invention provides a passive (self-pumping) phase conjugate mirror which allows for the first time a CW laser to have correction for intracavity phase distortions by utilizing a passive phase conjugate mirror as one of the end mirrors in the laser cavity in any passive phase conjugate mirror configuration. When the light beam coupling in the four-wave mixing crystal C is sufficiently strong, the passive phase conjugate mirror can be constructed using the nonlinear crystal C and only one external mirror.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. A passive phase conjugate mirror comprised of a single incident beam, a third-order nonlinear polarization medium and a passive optical system comprised of at least one ordinary mirror so disposed relative to said medium as to reflect said single incident beam diffracted by said medium back through said medium for producing a phase conjugate beam in response to said single incident beam.

2. A passive phase conjugate mirror comprised of a third-order nonlinear polarization medium and a passive optical system so disposed relative to said medium as to reflect an incident beam passing through said medium back through said medium for four-wave mixing, said passive optical system is further comprised of a second ordinary mirror aligned to reflect back through said medium an incident beam passing through said medium and reflected by said one ordinary mirror, and the alignment of said two mirrors with respect to said incident beam is oriented so that light passing through said medium experiences gain via nonlinear optical coupling in said medium.

3. A passive phase conjugate mirror as defined in claim 1 wherein said two ordinary mirrors are oriented on the same side of said medium to reflect radiation passing through said medium from said incident beam back through said medium.

4. A passive phase conjugate mirror as defined in claim 1 wherein said two ordinary mirrors are aligned to form a linear optical cavity containing said medium, and the alignment of said two mirrors with respect to said incident beam is oriented so that light in said cavity experiences gain via nonlinear optical coupling in said medium.

5. A passive phase conjugate mirror for a single incident beam of coherent light comprised of a third-order nonlinear polarization medium and a passive optical system comprised of at least one mirror so disposed relative to said medium as to reflect said single incident beam diffracted by said medium back through said medium producing a phase conjugate mirror in response to said single incident beam.

6. A passive phase conjugate mirror as defined in claim 5 wherein said optical system is further comprised of a second ordinary mirror, wherein said two mirrors are aligned to reflect said single beam diffracted by said medium back through said medium for four-wave mixing.

7. A passive phase conjugate mirror as defined in claim 6 wherein said two mirrors form a linear optical cavity containing said nonlinear medium.

8. A passive phase conjugate mirror as defined in claim 5 wherein said single beam is a beam from a laser gain medium and said phase conjugate mirror is at one end of said laser gain medium, and including a mirror at the other end of said laser gain medium aligned with said passive phase conjugate mirror to form an optical cavity containing said laser gain medium.

9. A passive phase conjugate mirror as defined in claim 8 wherein said optical system is further comprised of a second ordinary mirror, wherein said two mirrors are aligned to reflect said single beam refracted by said medium back through said medium for four-wave mixing.

10. A passive phase conjugate mirror as defined in claim 9 wherein said two mirrors form a linear optical cavity containing said nonlinear medium.

* * * * *